(12) United States Patent
Reining

(10) Patent No.: US 7,068,028 B2
(45) Date of Patent: Jun. 27, 2006

(54) METHOD AND APPARATUS FOR METAL TARGET PROXIMITY DETECTION AT LONG DISTANCES

(75) Inventor: William N. Reining, Cross Plains, WI (US)

(73) Assignee: Intellectual Property LLC, Cross Plains, WI (US)

( * ) Notice: Subject to any disclaimer, the term of this patent is extended or adjusted under 35 U.S.C. 154(b) by 440 days.

(21) Appl. No.: 10/661,884

(22) Filed: Sep. 12, 2003

(65) Prior Publication Data

US 2005/0062484 A1    Mar. 24, 2005

(51) Int. Cl.
*G01B 7/14* (2006.01)

(52) U.S. Cl. .............. 324/207.26; 324/207.16

(58) Field of Classification Search .......... 324/207.26, 324/207.16, 207.11, 207.13, 207.15, 326, 324/327, 228, 234, 236, 239; 340/551; 327/510
See application file for complete search history.

(56) References Cited

U.S. PATENT DOCUMENTS

| | | | |
|---|---|---|---|
| 3,199,022 A | 8/1965 | Brown et al. | |
| 4,050,011 A | 9/1977 | Mori et al. | |
| 4,638,262 A | 1/1987 | Miyamoto | |
| 4,646,022 A | 2/1987 | Brown | |
| 5,519,381 A | 5/1996 | Marsh et al. | |
| 5,537,105 A | 7/1996 | Marsh et al. | |
| 5,541,510 A * | 7/1996 | Danielson | 324/233 |
| 5,557,280 A | 9/1996 | Marsh et al. | |
| 5,566,441 A | 10/1996 | Marsh et al. | |
| 5,699,066 A | 12/1997 | Marsh et al. | |
| 5,726,630 A | 3/1998 | Marsh et al. | |
| 6,335,619 B1 * | 1/2002 | Schwab et al. | 324/207.26 |
| 6,359,449 B1 | 3/2002 | Reining et al. | |
| 6,499,656 B1 | 12/2002 | Marsh et al. | |
| 6,621,467 B1 | 9/2003 | Marsh | |
| 6,686,742 B1 * | 2/2004 | Candy | 324/329 |
| 2002/0153418 A1 | 10/2002 | Maloney | |
| 2003/0201321 A1 | 10/2003 | Maloney | |

* cited by examiner

*Primary Examiner*—Bot Ledynh
*Assistant Examiner*—Kenneth J. Whittington
(74) *Attorney, Agent, or Firm*—Quarles & Brady LLP

(57) ABSTRACT

A method and system for detecting a position of a metallic object are disclosed. The method includes (a) exciting a coil with an electrical signal to produce an electromagnetic field enveloping the object, (b) allowing a frequency of the electrical signal to be at the resonant frequency of the coil as affected by the object, and (c) adjusting a control signal controlling a characteristic of the electrical signal so that the characteristic substantially equals a predetermined standard level. The method further includes (d) periodically coupling and decoupling a resistive element in parallel with the coil while performing (a)–(c), and (e) deriving a signal based upon the control signal. The derived signal is indicative of a difference between first and second values of an intermediate signal functionally related to the control signal, which are obtained when the resistive element is coupled in parallel with the coil and decoupled, respectively.

20 Claims, 3 Drawing Sheets

METHOD AND APPARATUS FOR METAL TARGET PROXIMITY DETECTION AT LONG DISTANCES

FIELD OF THE INVENTION

The present invention relates to proximity sensors and, more particularly, to sensors for detecting the proximity of metallic objects.

BACKGROUND OF THE INVENTION

Sensors for detecting the proximity of metallic objects are known. Typically, such a proximity sensor operates by transmitting a magnetic field from a coil (or other antenna) on the sensor toward the metallic object. The transmitted magnetic field in turn stimulates eddy currents in the metallic object. As the magnetic flux lines reach the object's surface, the flux lines are reflected due to the large change in conductivity (almost infinite) between air and the conducting metal. The reflected magnetic flux reduces the total flux at the coil causing either the voltage on the coil to be reduced (in the case of a constant current coil drive) or the coil current to increase (in the case of a constant voltage drive).

As the number of flux lines that are reflected by the target increases, the coil voltage is reduced (or coil current is increased) more and more. Thus, as the sensor and metallic object come closer to one another, the voltage at the coil decreases (or the current in the coil increases), thereby providing an indication of increasing proximity. Likewise, as the sensor and metallic object become farther apart from one another, the voltage at the coil increases (or the current in the coil decreases), thereby providing an indication of decreasing proximity.

Despite the fact that such proximity sensors are known in the art, conventional proximity sensors are limited in terms of their range of operation. As the distance of a target metallic object increases, the proximity sensor's sensitivity to changes in the object's position decreases significantly. Although amplification of the proximity sensor's output signal can yield some improvement in the proximity sensor's sensitivity at larger distances, such amplification does not satisfactorily improve the performance of the proximity sensor. In particular, amplification ceases to improve the proximity sensor's performance when the sensitivity of the proximity sensor to changes in the target object's distance becomes so minimal as to be indistinguishable from noise or signal draft.

Standards for the performance of proximity sensors for metallic objects are set forth in the IEC document entitled "Low Voltage Switchgear and Control Gear, Part 5, Section 2 "Proximity Switches", (CEI/IEC 947-5-2)." The document specifies an operating distance for various diameter sensors as noted below in Table One.

TABLE ONE

IEC Required Detection Distances

| Sensor Type and Diameter | Embedded Sensor Range | Not Embedded Sensor Range |
| --- | --- | --- |
| A8 mm | 1 mm | 2 mm |
| A12 mm | 2 mm | 4 mm |
| A18 mm | 5 mm | 8 mm |
| A30 mm | 10 mm | 15 mm |
| B4 mm | .8 mm | — |

TABLE ONE-continued

IEC Required Detection Distances

| Sensor Type and Diameter | Embedded Sensor Range | Not Embedded Sensor Range |
| --- | --- | --- |
| B6 mm | 1 mm | — |
| C26 mm | 10 mm | 15 mm |
| C30 mm | 10 mm | 15 mm |
| C40 mm | 15 mm | 20 mm |
| D60 mm | 25 mm | — |
| D80 mm | 40 mm | — |

Due to the limitations of conventional proximity sensors as discussed above, conventional proximity sensors are typically able to only exceed the above standards by a factor of 2 to 3. Nevertheless, it would be advantageous if new proximity sensors could be developed that were significantly more sensitive than extended range conventional sensors. In particular, it would be advantageous if such new proximity sensors could successfully sense metallic objects at distances that were an order of magnitude (e.g., 10 times) greater than those specified by the IEC. Further, it would be advantageous if such new proximity sensors could be easily and cost-effectively implemented.

SUMMARY OF THE INVENTION

The present inventor has recognized that, when a metallic target object is positioned within a certain range of distances away from a proximity sensor, an effective resistance experienced at the proximity sensor varies with changes in the position of the target object in significantly different manners depending upon other resistances coupled in parallel with the sensor coil. Consequently, by detecting the effective resistance of the proximity sensor both when the sensor coil is coupled in parallel with and also decoupled from an additional resistor, further information about the position of the target object can be gained. In particular, measurements of this type can be utilized to extend the range of sensitivity of a given proximity sensor by 10 or more times its normal range of sensitivity.

In particular, the present invention relates to a method of detecting a position of a metallic object. The method includes (a) exciting a coil with an electrical signal to produce an electromagnetic field enveloping the metallic object, (b) allowing a frequency of the electrical signal to be at the resonant frequency of the coil as affected by the metallic object, and (c) adjusting a control signal controlling a characteristic of the electrical signal so that the amplitude of oscillation substantially equals a predetermined standard level. The method further includes (d) periodically coupling and decoupling a resistive element in parallel with the coil while performing (a) through (c), and (e) deriving a signal based upon the adjusted control signal during at least a first time period. The derived signal is indicative of a difference between at least one first value of an intermediate signal functionally related to the adjusted control signal obtained when the resistive element is coupled in parallel with the coil and at least one second value of the intermediate signal obtained when the resistive element is decoupled, and the derived signal is further indicative of the position of the metallic object.

The present invention additionally relates to a sensor for detecting a position of a metallic object. The sensor includes a conductive coil and an oscillator connected to the conductive coil to (1) drive the conductive coil with an oscillating current based upon an external control signal and (2) to receive feedback from the conductive coil and allow a frequency of the oscillating current to vary in accordance with a varying resonant frequency of the conductive coil as affected by the metallic object. The sensor further includes an amplitude control circuit connected to the oscillator to provide the external control signal to adjust the oscillating current, and an additional circuit coupled to the conductive coil, where the additional circuit operates to couple and decouple a resistive element in relation to the conductive coil at first and second times, respectively. The sensor additionally includes a processing circuit coupled to the amplitude control circuit, where the processing circuit derives an output signal based upon the external control signal. The output signal is derived, at least during some periods of operation of the sensor, based upon a difference between a first sample of at least one of the external control signal and an intermediate signal functionally related to the external control signal obtained at the first time and a second sample of at least one of the external control signal and the intermediate signal obtained at the second time.

The present invention further relates to a sensor for detecting a position of a metallic object. The sensor includes an antenna circuit capable of transmitting and receiving electromagnetic signals, where the antenna circuit further provides an intermediate signal indicative of a characteristic of operation of the antenna circuit, and a secondary circuit capable of periodically adjusting an effective resistance of at least a portion of the antenna circuit. The sensor additionally includes a processing circuit capable of determining an output signal indicative of the position of the metallic object based upon the intermediate signal, where the processing circuit determines the output signal at least in part based upon differences that occur in the intermediate signal between first and second times at which the effective resistance is adjusted to first and second levels, respectively.

DETAILED DESCRIPTION OF THE PREFERRED EMBODIMENT

Figure 1A:
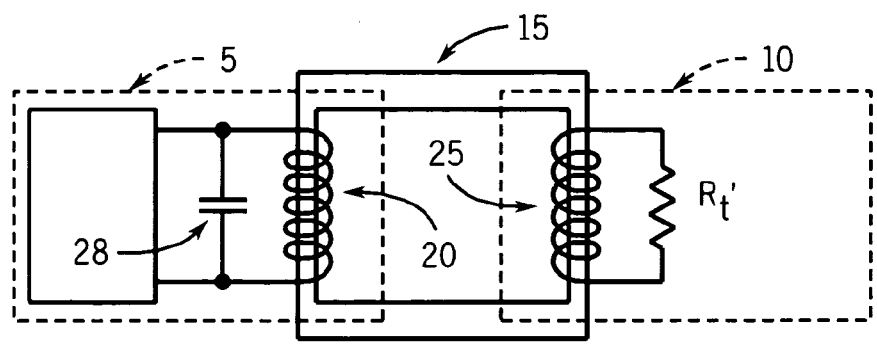
FIGS. 1(A) and 1(B) show two schematic models representative of the operation of a conventional proximity sensor in relation to a metallic target object (Prior Art)

Referring to FIG. 1(A) (Prior Art), the interaction between a proximity sensor 5 and target object 10 can be modeled as if the interaction were by way of a transformer 15. That is, a coil 20 of the sensor 5 can be considered to be a primary winding of the transformer 15, where the coil is coupled in parallel with a capacitor 28 to form an oscillator-driven resonant tank circuit. Further, the target object 10 with its eddy currents can be considered to be a secondary winding 25 of the transformer that is loaded by an internal resistance $R_t$ of the target object. Modeled in this way, the coupling coefficient of the transformer 15 represents the distance between the sensor coil 20 and the target object 10.

Figure 1B:
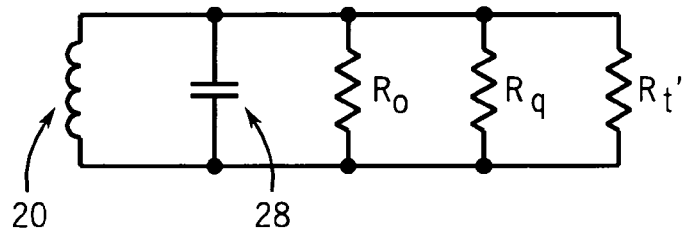

Alternatively, referring to FIG. 1(B) (Prior Art), one can also view the interaction between the proximity sensor 5 and the target object 10 as occurring by way of a tightly coupled transformer, with a coupling coefficient near one. If viewed in this way, the circuit can be modeled as shown in FIG. 1(B) simply as the primary coil 20 coupled in parallel with the capacitor 28 and each of first, second and third equivalent resistances $R_o$, $R_q$, and $R_t'$. The first, second and third equivalent parallel resistances $R_o$, $R_q$, and $R_t'$ respectively correspond to the oscillator output resistance, the resistance associated with the tank circuit formed by the coil 20 and the capacitor 28, and resistance $R_t$ of the target object 10 as it affects the tank circuit (e.g., as effectively changed by the distance between the coil and the target object).

Modeled in this way, the system has an overall parallel equivalent resistance $R_p$ equal to the parallel combination of the first, second and third equivalent resistances $R_t'$ $R_o$, and $R_q$ as follows:

$$R_p = (1/R_t' + 1/R_o + 1/R_q)^{-1} \qquad (1)$$

Because $R_o$ and $R_q$ are (essentially) fixed values, equation (1) can also be expressed as follows:

$$R_p = (1/R_t' + 1/R_f)^{-1} \qquad (2)$$

where $R_f$ (essentially) is a constant value.

From equation (1), it is apparent that the output resistance of the oscillator ($R_o$) must be high in order to not dominate the parallel equivalent resistance of the circuit ($R_p$). Further, from equation (2), it is apparent that when one of $R_t'$ or $R_f$ is much smaller than the other, the smaller value dominates $R_p$. This can be seen in FIG. 2 (Prior Art), which shows the variation in $R_p$ as a function of variation in $R_t'$ assuming a value for $R_f$ of 1. Specifically, as shown, as $R_t'$ becomes large (indicating that the coil and target object are far apart), $R_p$ tends to the value of $R_f$ (a value of 1), while as $R_t'$ becomes small (indicating that the coil and target object are close), $R_p$ tends to the value of $R_t'$.

Figure 3:
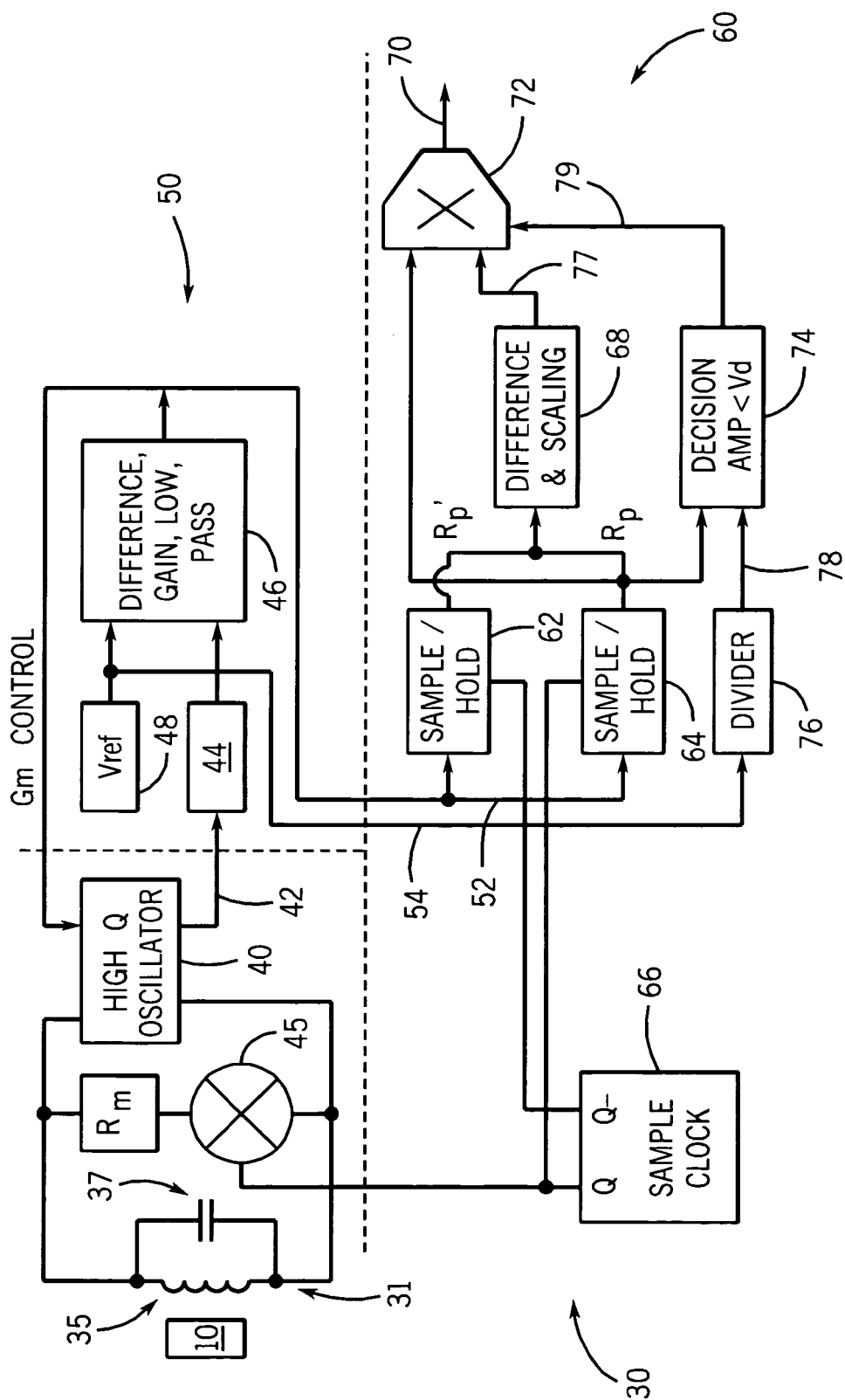
FIG. 3 is a schematic diagram showing an exemplary embodiment of a new proximity sensor, in a generalized form.

Turning to FIG. 3, a new proximity sensor 30 for sensing metallic objects such as the target object 10 is shown. In contrast to conventional proximity sensors, the proximity sensor 30 includes not only a tank circuit 31 including a coil 35 and a capacitor 37 driven to oscillate by an oscillator (in this case, a high Q oscillator 40), but also includes an additional resistance $R_m$ that is coupled in series with a switching device 45. The series combination of the switching device 45 and the additional resistance $R_m$ is in turn coupled in parallel with the tank circuit 31 and the oscillator 40. Consequently, the additional resistance $R_m$ can be coupled in parallel with and decoupled from the oscillator 40 and the tank circuit 31 depending upon the status of the switching device 45.

Figure 4:
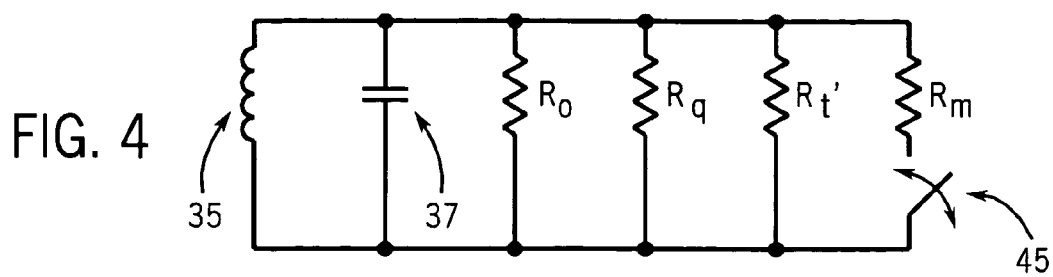
FIG. 4 is a schematic model representative of the operation of the new proximity sensor of FIG. 3 in relation to a metallic target object.

Given the presence of the additional resistance $R_m$ and the switching device 45, the interaction of the proximity sensor 30 in conjunction with a target object such as the target object 10 can be modeled as shown in FIG. 4. In contrast to FIG. 1(B), FIG. 4 shows the series combination of the switching device 45 and additional resistance $R_m$ to be coupled in parallel with each of the coil 35, the capacitor 37, and each of the resistances $R_o$, $R_q$ and $R_t'$. Consequently, when the switching device 45 is switched on so that the additional resistance $R_m$ is coupled in parallel with the coil 25, capacitor 37 and resistances $R_o$, $R_q$ and $R_t'$, the parallel equivalent resistance of the circuit $R_p$ changes to a new parallel equivalent resistance $R_p'$, where the new parallel equivalent resistance $R_p'$ is determined by either of equations (3) and (4) below (where $R_f$ is based upon $R_o$ and $R_q$ in the same manner as for equation (2)):

$$R_p'=(1/R_t'+1/R_o+1/R_q+1/R_m)^{-1} \quad (3)$$

$$R_p'=(1/R_t'+1/R_f+1/R_m)^{-1} \quad (4)$$

Figure 5:
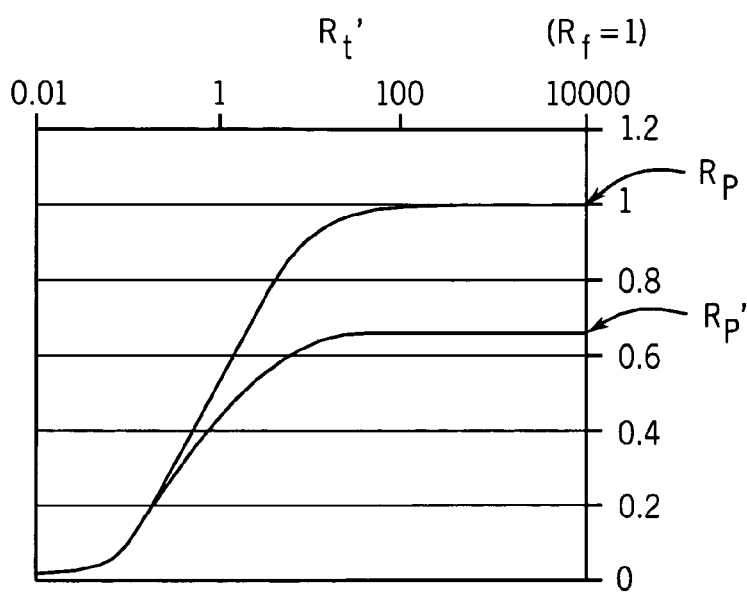
FIG. 5 is a graph showing exemplary variation of a parallel equivalent resistance of the new proximity sensor of FIG. 3 under first and second operational circumstances.

Therefore, if the additional resistance $R_m$ is alternately coupled in parallel with the coil 25 (and other parallel components) and decoupled from the coil 25, the parallel equivalent resistance alternates between $R_p'$ and $R_p$. Referring further to FIG. 5, therefore, the variation in the parallel equivalent resistance with the position of the target object 10 follows one of two curves depending upon whether the additional resistance $R_m$ is coupled in parallel with the coil 25 or not. In particular, when the additional resistance $R_m$ is not coupled in parallel with the coil, the parallel equivalent resistance follows the $R_p$ curve, which can be the same as that of FIG. 2. In contrast, when the additional resistance $R_m$ is coupled in parallel with the coil 25, the parallel equivalent resistance follows the $R_p'$ curve.

Figure 6:
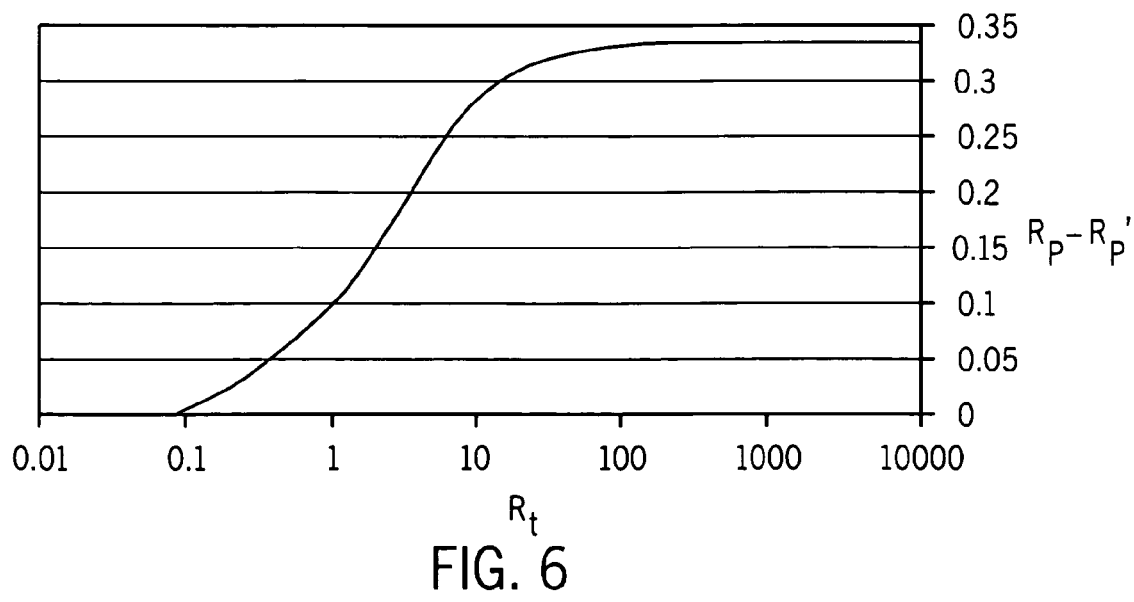
FIG. 6 is a graph showing exemplary variation of a difference between the parallel equivalent resistance obtained under the first operational circumstance shown in FIG. 6 and the parallel equivalent resistance obtained under the second operational circumstance shown in FIG. 6.

Referring additionally to FIG. 6, the difference between the $R_p'$ (normalized to $R_p$) and $R_p$ curves increases significantly as $R_t'$ increases between values of approximately 0.1 and 100, that is, as the distance between the coil 25 and the target object increases from being moderately close to moderately far away. In particular, the difference varies sharply between values of $R_t'$ between 1 and 10. Consequently, the difference between the $R_p'$ and $R_p$ curves constitutes an additional useful indication of the distance of the target object 10 from the coil 25, particularly when the target object is in the range where $R_p'$ is approximately equal to $R_p$. However, the difference between the $R_p'$ and $R_p$ curves becomes negligible when the target object is close to the coil 25, and thus does not provide any significant additional distance information in such circumstances. Also, the difference between the $R_p'$ and $R_p$ curves does not vary significantly as the distance of the target object exceeds a certain moderate distance away from the coil 25 (e.g., distances corresponding to $R_t'>100$), and therefore does not provide any significant additional distance information at such large distances.

The values of the parallel equivalent resistance $R_p$ and $R_p'$ (and consequently the difference between $R_p$ and $R_p'$ at any given time) are detectable in a variety of ways using a variety of different electronic circuits. If the additional resistance $R_m$ is periodically switched in and out of parallel with the coil 35, the variation in the parallel equivalent resistance can be easily detected as changes in the oscillator output using standard envelope detection (e.g., AM demodulation or peak/valley sensing) techniques and AC amplification techniques. Thus, standard detector circuits for AC signals such as rectifiers, RMS converters and other known circuitry can be employed to determined the difference between $R_p$ and $R_p'$ and thus determine the distance of a target object.

Returning to FIG. 3, in certain embodiments the sensor 30 for example employs circuitry that includes a control circuit 50 and an additional processing circuit 60. The control circuit 50 operates to control the excitation of the high Q oscillator 40 by providing a first intermediate signal 52 to the oscillator the first intermediate signal 52 controls the oscillator 40 to compensate for changes in the quality factor of the tank circuit 31 that occur due to variation in the position (or identity) of the target object 28 as well as due to the coupling and decoupling of $R_m$ in parallel with the tank circuit.

The control circuit 50 additionally outputs the intermediate signal 52 (or a signal that is based upon that signal) to the additional processing circuit 60. Insofar as the first intermediate signal 52 compensates for changes in the quality factor of the tank circuit 31, the signal is also indicative of the parallel equivalent resistance values $R_p$ and $R_p'$ as the switch 45 is switched on and off. In embodiments such as those represented by FIG. 3, the intermediate output signal 52 can be a voltage signal where the voltage is indicative of the parallel equivalent resistance values $R_p$ and $R_p'$.

The additional processing circuit 60 controls the switching of the switch 45 and additionally processes the first intermediate signal 52 generated by the control circuit 50 in order to generate an overall output signal 70 that is indicative of the position of the target object 10 relative to the coil 35. As discussed in further detail below, the exemplary additional processing circuit 60 shown in FIG. 3 in particular performs the following functions: (a) alternates the switching status of the switch 45 at successive time periods so that the parallel equivalent resistance repeatedly switches between $R_p$ and $R_p'$; (b) obtains values indicative of each of $R_p$ and $R_p'$ during the successive time periods; (c) determines the difference between the values indicative of $R_p$ and $R_p'$ obtained in successive time periods (e.g., calculates $R_p-R_p'$); (d) determines whether the calculated difference value or simply the value indicative of $R_p$ alone is a better indication of the position of the target object 10; and (e) provides the selected value (or a value determined based upon the selected value) as the output signal 70 representing the position of the target object.

More specifically, as shown in FIG. 3, the control circuit 50 operates as follows. The control circuit 50 receives an output signal 42 from the high Q oscillator 40 indicative of one or more characteristics of the tank circuit 31 driven by the high Q oscillator, e.g., the Q of the tank circuit 31. This output signal 42 is provided to an amplitude detector circuit 44 that detects the amplitude of the output signal 42 (which is AC and indicative of Q) and in turn provides an output (e.g., a DC voltage) proportional to the amplitude of the output signal 42. The output signal 42 of the amplitude detector circuit 44 is next provided to circuitry 46 that compares the output signal with a voltage threshold level $V_{ref}$ provided by a voltage source 48 to obtain a difference signal. The circuitry 46 further amplifies the difference signal and low pass filters the amplified difference signal in order to obtain the first intermediate signal 52, which both is used to control the high Q oscillator 40 and is provided to the additional processing circuit 60 as an indication of the parallel equivalent resistance ($R_p$ or $R_p'$ depending upon whether the switch 45 is open or closed). By virtue of the control feedback provided by the first intermediate signal 52, the amplitude of the high Q oscillator 40 is precisely controlled to a constant value. Thus, the effect of amplitude on the quality factor measurement is essentially eliminated.

Exemplary circuit components that can be employed as the high Q oscillator 40 and the amplitude detector circuit 44, circuitry 46 and voltage source 48 are shown in U.S. Pat. No. 6,359,449, which issued on Mar. 19, 2002 and which is hereby incorporated by reference herein. Thus, an exemplary high Q oscillator 40 could be provided through the use of an operational transconductance amplifier (OTA) that provides the output signal 42 to the control circuit 50. In particular, when employing such an OTA, an output terminal of the device would be coupled to each of (a) one junction of the coil 35 and the capacitor 37 of the tank circuit 31 (with the other junction between the coil 35 and capacitor 37 being coupled to ground), (b) a non-inverting input the OTA so that the OTA is in a positive feedback configuration, and (c) the control circuit 50. In this positive feedback configuration, the output current of the OTA naturally oscillates at the resonant frequency of the tank circuit 31. Additionally, the output current provided by the OTA can be modeled as a gain factor $G_m$ times the voltage applied between its inverting and non-inverting inputs, where the value $G_m$ is determined by an amplifier bias current.

Additionally, in such an embodiment, the amplitude detector circuit 44 and the low-pass filter portion of the circuitry 46 can be provided through the use of a precision rectifier and conventional low-pass filter. The synchronous rectifier in particular can be realized by two sample and hold circuits that drive a difference amplifier. Other rectifier forms may be used including an analog multiplier or a precision rectifier. Also, any noise signal existing at the output of the OTA that is asynchronous with the oscillator signal will average to zero in the low pass filter section. Further, a standard high-gain operational amplifier can be used as the differencing and gain portions of the circuitry 46, where the non-inverting input of the operational amplifier is coupled to the voltage source 48 and the inverting input of the operational amplifier receives the output of the low-pass filter coupled to the synchronous rectifier. The operational amplifier operates open-loop such that, if the voltage on the inverting input of the amplifier is greater than the voltage threshold level $V_{ref}$ provided by the voltage source 48, the output of the amplifier will be a negative value and, if the voltage on the inverting input of the amplifier is negative with respect to $V_{ref}$, the output of the amplifier will be positive. The output of the operational amplifier has a voltage that constitutes the first intermediate signal 52 and, as applied through a limiting resistor, also generates the bias current for the OTA. Thus, the connection of the output of the amplifier to the OTA provides feedback control of the amplitude of the oscillator signal to the value of $V_{ref}$.

Referring again to FIG. 3, the additional processing circuit 60 in certain embodiments includes first and second sample and hold circuits 62 and 64, respectively, that are coupled to the control circuit 50 to receive the first intermediate signal 52. The first and second sample and hold circuits 62,64 are commanded to sample and hold values of the first intermediate signal 52 at alternating first and second times, respectively, by a clock circuit 66 that governs the switching of the switch 45. Specifically, the first sample and hold circuit 62 is commanded to sample and hold values of the first intermediate signal 52 at a first set of times when the clock circuit 66 is causing the switch 45 to couple the resistor $R_m$ in parallel with the tank circuit 31, and the second sample and hold circuit 64 is commanded to sample and hold values of the first intermediate signal 52 at a second set of times when the clock circuit is causing the switch 45 to decouple the resistor $R_m$ from the tank circuit. Thus, the first and second sample and hold circuits 62,64 respectively obtain values that are respectively indicative of $R_p'$ and $R_p$. Additionally as shown, the outputs of the first and second sample and hold circuits 62,64 are each coupled to a difference and scaling circuit 68. The difference and scaling circuit 68 obtains the difference between the values provided to it from the first and second sample and hold circuits 62,64, which is indicative of $R_p-R_p'$. The difference and scaling circuit 68 further is capable of scaling the resulting difference value, and outputting the scaled difference signal as an output signal 77.

As discussed above, the difference between Rp and Rp' is most indicative of the position of the target object 10 when that target object is within a certain range of distances of the coil 35. If the target object 10 comes closer than that range, the difference between $R_p$ and $R_p'$ becomes negligible, and consequently a better indication of the position of the target object is simply that of $R_p$. In order for the sensor 30 to continue to sense the position of the target object 10 in a relatively seamless manner regardless of whether the target object is within the range of distances in which the difference between $R_p$ and $R_p'$ is meaningful and the distances closer than that range, the processing circuit 60 additionally includes a multiplexer 72, a decision circuit 74, and a divider circuit 76.

As shown, the divider circuit 76 generates a threshold level signal 78 that is indicative of a threshold level that is representative of a minimum distance of the target object 10 at which the difference between $R_p$ and $R_p'$ provides a useful indication of the target object's distance. In the embodiments shown, the divider circuit 76 provides the threshold level signal 78 by receiving the threshold voltage $V_{ref}$ used in the control circuit 50 (provided as a second intermediate signal 54) and dividing that value by a certain amount. The threshold level signal 78 in turn is compared at the decision circuit 74 (which can be a comparator) with the signal output by the second sample and hold circuit 64, which is indicative of the value of $R_p$.

If $R_p$ is above the threshold level, then the decision circuit 74 provides a decision output signal 79 to the multiplexer 72 such that the multiplexer outputs the output signal 77 of the difference and scaling circuit 68 as the output signal 70. However, if $R_p$ is below the threshold level, then the decision circuit 74 instead provides a different signal as the decision output signal 79 to the multiplexer 72 causing the multiplexer to output simply the output of the second sample and hold circuit 64 (i.e., indicating the value of $R_p$ alone) as the output signal 70. Assuming proper scaling by the difference and scaling circuit 68 (and proper dividing by the divider circuit 76), the output signal 70 can be made to transition seamlessly in situations where the target object 10 moves between the range in which $R_p-R_p'$ is a useful indicator of the object's position and positions that are closer to the coil 35 than that range.

Figure 2:
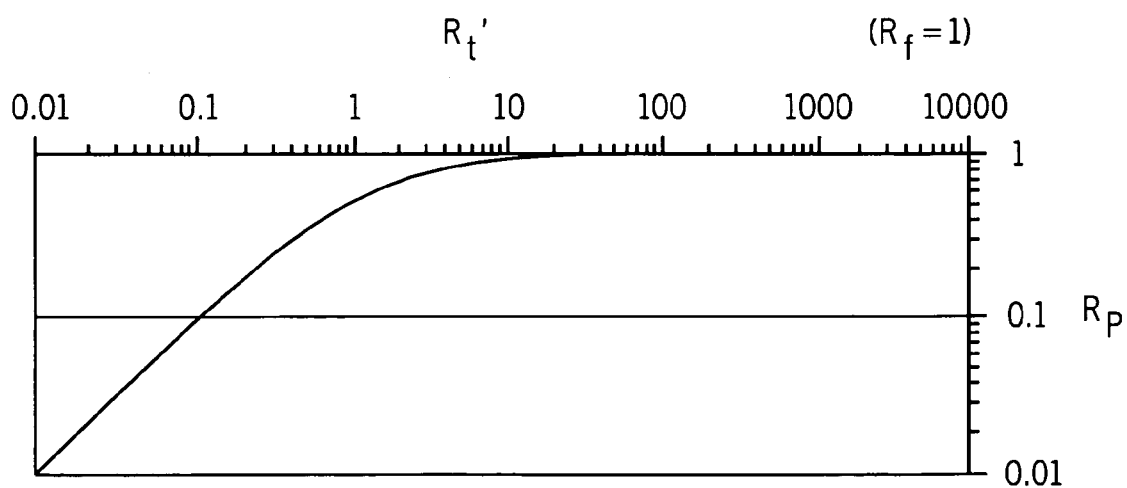
FIG. 2 is a graph showing exemplary variation of a parallel equivalent resistance of a conventional proximity sensor in response to changes in position of a metallic target object (Prior Art)

From the figures, particularly FIGS. 2, 5 and 6, it is apparent that the present invention makes it possible to extend the range of sensitivity of proximity sensors by one or more orders of magnitude (i.e., improve sensitivity by a factor of 10 or more). Although FIG. 3 is representative of several embodiments of proximity sensors that are in accordance with the present invention, the present invention is intended to encompass a variety of embodiments of sensors having features that are different from those of FIG. 3.

In particular, the present invention is intended to encompass all proximity sensors that include an antenna (such as a coil or a coil with a magnetic focusing method) in which a first indication of proximity based upon the electrical characteristic of that antenna's operation is supplemented by a second indication of proximity based upon the electrical characteristic of that antenna's operation when that antenna is coupled to a resistive component, such that a third indication of proximity based upon the difference between the first and second indications can also be determined and utilized. Indeed, the present invention is intended to encompass all such proximity sensors that utilize such information, regardless of what type(s) of components are employed within such proximity sensors for exciting or otherwise creating a transmission signal at the antenna, detecting variations in one or more electrical characteristics of the antenna that can arise due to the antennas interaction with other components, and processing such detected information.

That is, the present invention is not intended to be limited to the embodiments shown. For example, the control circuit 50 of FIG. 3 could employ an auto-zeroing amplifier using the current value of $R_p$ as a zeroing point, Further, the present invention is not intended to be limited only to embodiments of sensors that employ a control circuit for controlling an oscillator and, based upon the control signals provided by that control circuit to maintain an operational characteristic of the oscillator, are able to determine indications of a target object's proximity. Nor is the present invention intended to be limited only to embodiments that employ additional processing circuitry that such as that shown in FIG. 3. For example, in certain alternate embodiments, the sensor would be configured to detect only the position of target objects when those objects were generally within the range in which the difference between Rp and Rp' provides a useful indication of position. Thus, in such embodiments, the sensor would not employ any of the divider circuit 76, the decision circuit 74 or the multiplexer 72.

Many other modifications and variations of the preferred embodiment which will still be within the spirit and scope of the invention will be apparent to those with ordinary skill in the art. In order to apprise the public of the various embodiments that may fall within the scope of the invention, the following claims are made.

I claim:

1. A method of detecting a position of a metallic object, the method comprising:
   (a) exciting a coil with an electrical signal to produce an electromagnetic field enveloping the metallic object;
   (b) allowing a frequency of the electrical signal to be at the resonant frequency of the coil as affected by the metallic object;
   (c) adjusting a control signal controlling a characteristic of the electrical signal so that the amplitude of oscillation substantially equals a predetermined standard level;
   (d) periodically coupling and decoupling a resistive element in parallel with the coil while performing (a) through (c); and
   (e) deriving a signal based upon the adjusted control signal during at least a first time period,
   wherein the derived signal is indicative of a difference between at least one first value of an intermediate signal functionally related to the adjusted control signal obtained when the resistive element is coupled in parallel with the coil and at least one second value of the intermediate signal obtained when the resistive element is decoupled, and wherein the derived signal is further indicative of the position of the metallic object.

2. The method of claim 1, wherein the derived signal is representative of a resistance differential between a first resistance level occurring when the resistive element is coupled in parallel with the coil and a second resistance level occurring when the resistive element is decoupled from the coil, wherein the resistance differential is indicative of the position of the metallic object.

3. The method of claim 1, wherein (e) includes amplifying the adjusted control signal.

4. The method of claim 1, wherein (b) is performed by an amplifier having positive feedback from the coil.

5. The method of claim 1 wherein (c) is performed using a rectifier receiving the electrical signal from the coil and rectifying the electrical signal synchronously with the phase of the electrical signal.

6. The method of claim 5 wherein (c) is performed by multiplying the electrical signal by itself, and wherein the characteristic controlled by the adjusted control signal is an amplitude of the electrical signal.

7. The method of claim 1, wherein the adjusted control signal has an envelope with a periodicity corresponding to the periodic coupling and decoupling of the resistive element,
   wherein an amplitude of the envelope of the adjusted control signal is indicative of the position of the metallic object, and
   wherein the envelope is substantially rectangular.

8. The method of claim 1, wherein the difference is scaled.

9. The method of claim 8, further comprising, during a second time, deriving the signal based only upon at least one third value of the intermediate control signal obtained when the resistive element is decoupled.

10. The method of claim 9, further comprising:
    comparing at least one second value of the intermediate signal with a threshold level, wherein the deriving of the signal based only upon the at least one third value begins when one of the second values falls below the threshold level.

11. A sensor for detecting a position of a metallic object, the sensor comprising:
    a conductive coil;
    an oscillator connected to the conductive coil to:
      (1) drive the conductive coil with an oscillating current based upon an external control signal;
      (2) to receive feedback from the conductive coil and allow a frequency of the oscillating current to vary in accordance with a varying resonant frequency of the conductive coil as affected by the metallic object;
    an amplitude control circuit connected to the oscillator to provide the external control signal to adjust the oscillating current;
    an additional circuit coupled to the conductive coil, wherein the additional circuit operates to couple and decouple a resistive element in relation to the conductive coil at first and second times, respectively; and
    a processing circuit coupled to the amplitude control circuit,
    wherein the processing circuit derives an output signal based upon the external control signal, and
    wherein the output signal is derived, at least during some periods of operation of the sensor, based upon a difference between a first sample of at least one of the external control signal and an intermediate signal functionally related to the external control signal obtained at the first time and a second sample of at least one of the external control signal and the intermediate signal obtained at the second time.

12. The sensor of claim 11,
    wherein the additional circuit includes a switch coupled in series with a resistor, and wherein the switch operates to alternately couple the resistor in parallel with the coil and decouple the resistor from being coupled in parallel with the coil.

13. The sensor of claim 12, further comprising a clock coupled to the switch of the additional circuit so as to periodically open and close the switch.

14. The sensor of claim 13, further comprising first and second sample and hold circuits, wherein the first sample and hold circuit obtains a plurality of primary samples including the first sample at a plurality of primary times when the switch is closed, and the second sample and hold circuit obtains a plurality of secondary samples including the second sample at a plurality of secondary times when the switch is opened.

15. The sensor of claim 14, wherein the first and second sample and hold circuits are coupled to the clock.

16. The sensor of claim 11, further comprising a device that compares the second sample with a threshold level and, if the second sample is below the threshold level, causes the output signal to be derived based upon at least one of the second sample and a plurality of additional samples that are obtained at a plurality of third times when the resistive circuit is decoupled from the coil.

17. The sensor of claim 16 further comprising a multiplexer coupled to the device.

18. The sensor of claim 11, wherein the oscillator is a gain controlled amplifier having an output connected to the coil and configured for positive feedback.

19. A sensor for detecting a position of a metallic object, the sensor comprising:
   an antenna circuit capable of transmitting and receiving electromagnetic signals, wherein the antenna circuit further provides an intermediate signal indicative of a characteristic of operation of the antenna circuit;
   a secondary circuit capable of periodically adjusting an effective resistance of at least a portion of the antenna circuit; and
   a processing circuit capable of determining an output signal indicative of the position of the metallic object based upon the intermediate signal;
   wherein the processing circuit determines the output signal at least in part based upon differences that occur in the intermediate signal between first and second times at which the effective resistance is adjusted to first and second levels, respectively.

20. The sensor of claim 19, wherein the processing circuit includes means for determining when the intermediate signal falls below a threshold level.

* * * * *